June 26, 1945. M. GARANCHER ET AL 2,378,998

LUBRICANT COMPRESSOR

Filed March 8, 1943 3 Sheets-Sheet 3

Inventors:
Marcel Garancher
Charles F. Prisch
By Williams, Bradbury & Hinkle
Attorneys Patented June 26, 1945

2,378,998

UNITED STATES PATENT OFFICE 2,378,998

LUBRICANT COMPRESSOR

Marcel Garancher and Charles F. Raisch, Chicago, Ill., assignors to Stewart-Warner Corporation, Chicago, Ill., a corporation of Virginia Application March 8, 1943, Serial No. 478,368

8 Claims. (Cl. 103—11)

This invention relates to lubricant compressors of a type adapted to be mounted on one or more wheels for portability and provided with its own source of power for its operation.

Our invention is intended for use to service fleets of trucks or airplanes or machinery, or other equipment positioned such that it is impracticable to use a stationary compressor.

One object of the invention is to provide a structure which is free of external pipe connections or other parts liable to be broken through rough handling of the portable compressor.

An important object of our invention is to provide a compressor capable of producing a very high grease pressure, but one which requires no appreciable power for its operation when no grease is being delivered under pressure.

In our application for patent, Serial No. 458,700, filed September 17, 1942, one or more pistons for pumping lubricant are continuously operated by the motor, even though no grease is being delivered by the pump or pumps, the supply of grease to the intake of the compression cylinders being cut off when no grease is being delivered from the discharge side of the pressure cylinders. The reciprocation of the pistons requires some power and, therefore, consumes fuel even though no grease is being delivered.

In accordance with our present invention, automatically operating means are provided for holding the compressor piston in a depressed position sufficient to close the intake ports until such time as the pressure on the grease is slightly reduced for delivery of grease under pressure to a bearing or other part to be greased.

Other objects and advantages of our invention will become apparent from the following description of the preferred embodiment illustrated in the accompanying drawings, in which similar characters of reference refer to similar parts throughout the several views.

In the drawings,

Fig. 5 is a section of the valve mechanism taken on the line 5—5 of Fig. 3; and

Fig. 6 is a section of the clutch mechanism taken on the line 6—6 of Fig. 1.

Figure 1:
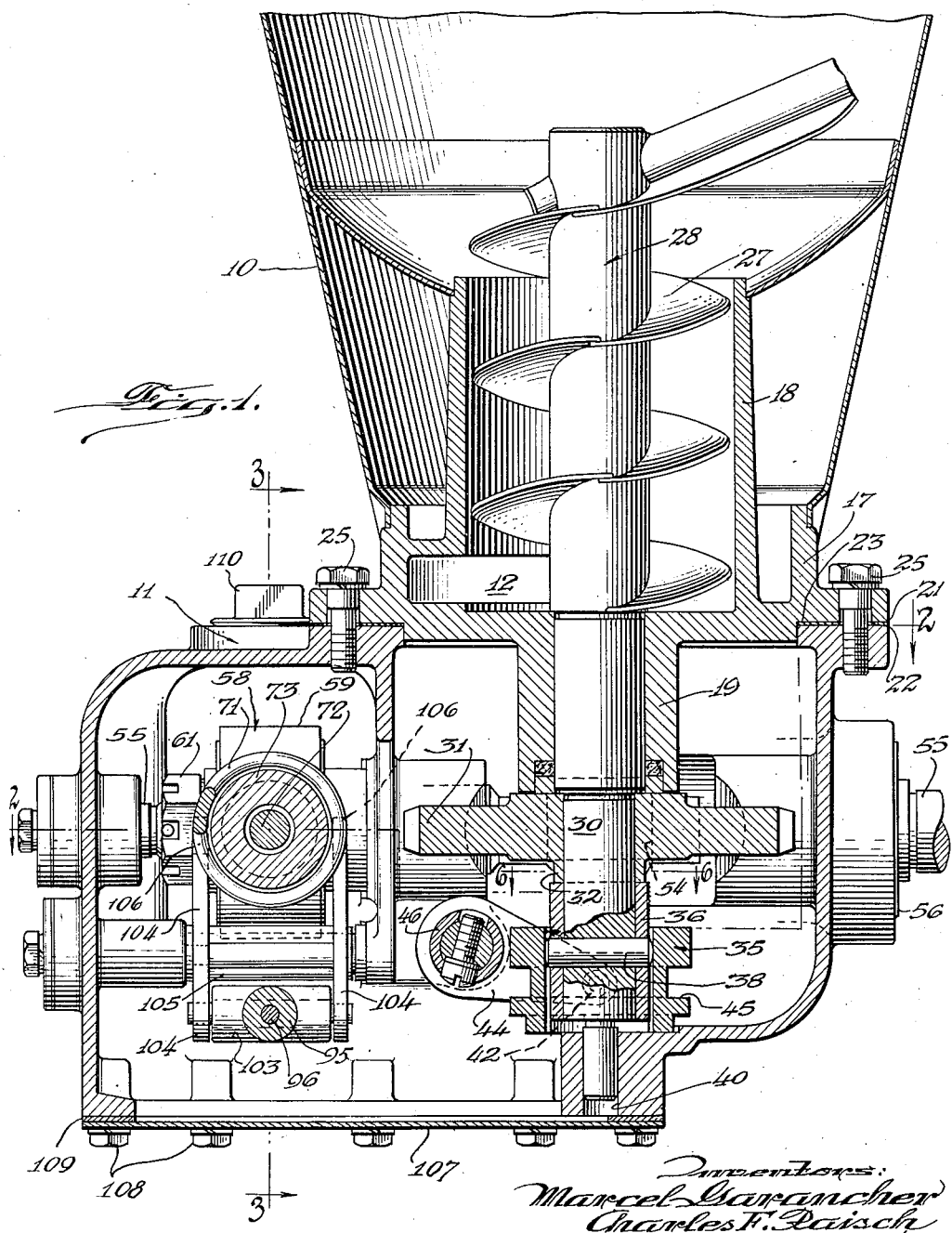
Fig. 1 is a sectional elevation with a portion of the grease hopper omitted.
Figure 2:
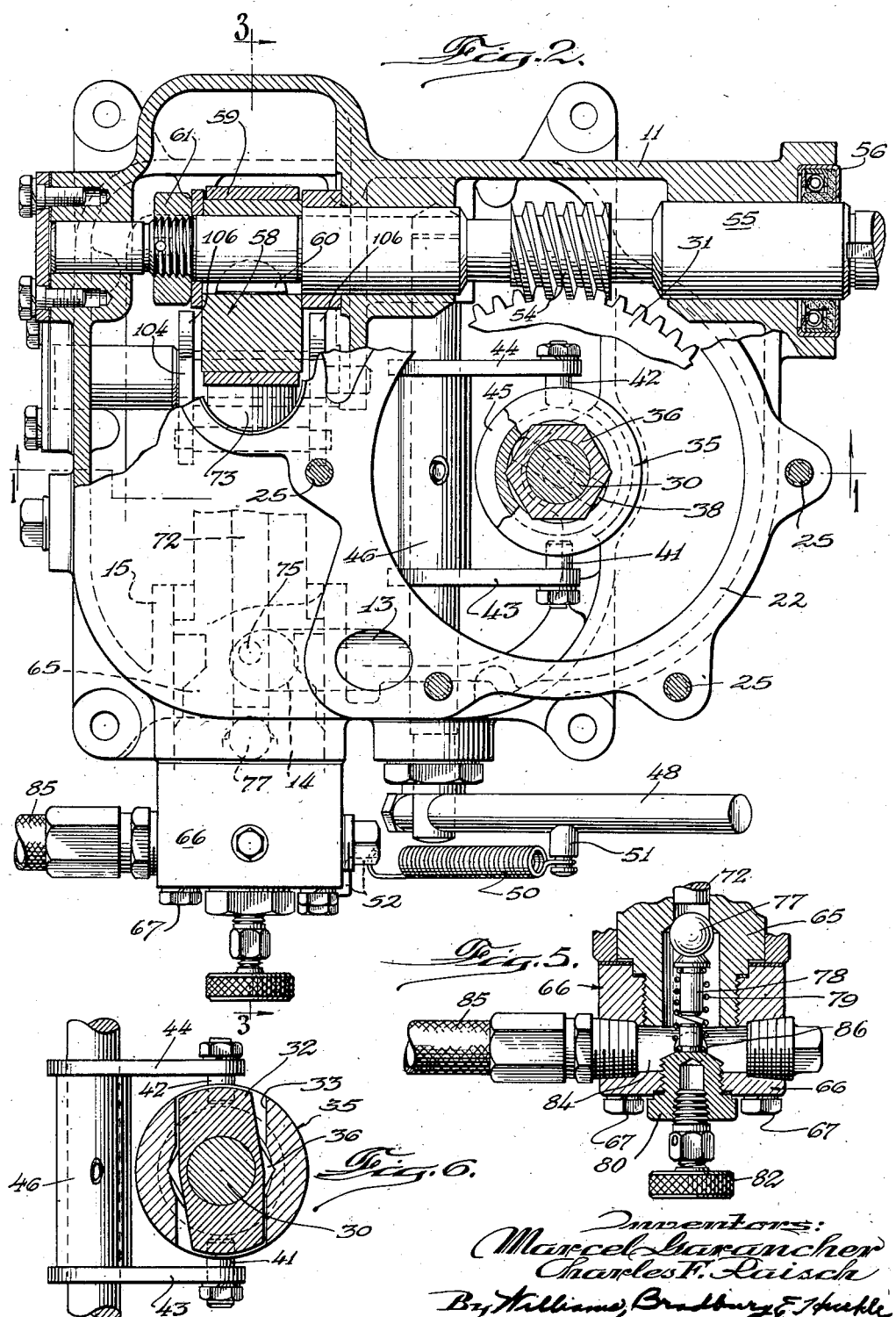
Fig. 2 is a plan of our invention partly in section with the hopper removed.
Figure 4:
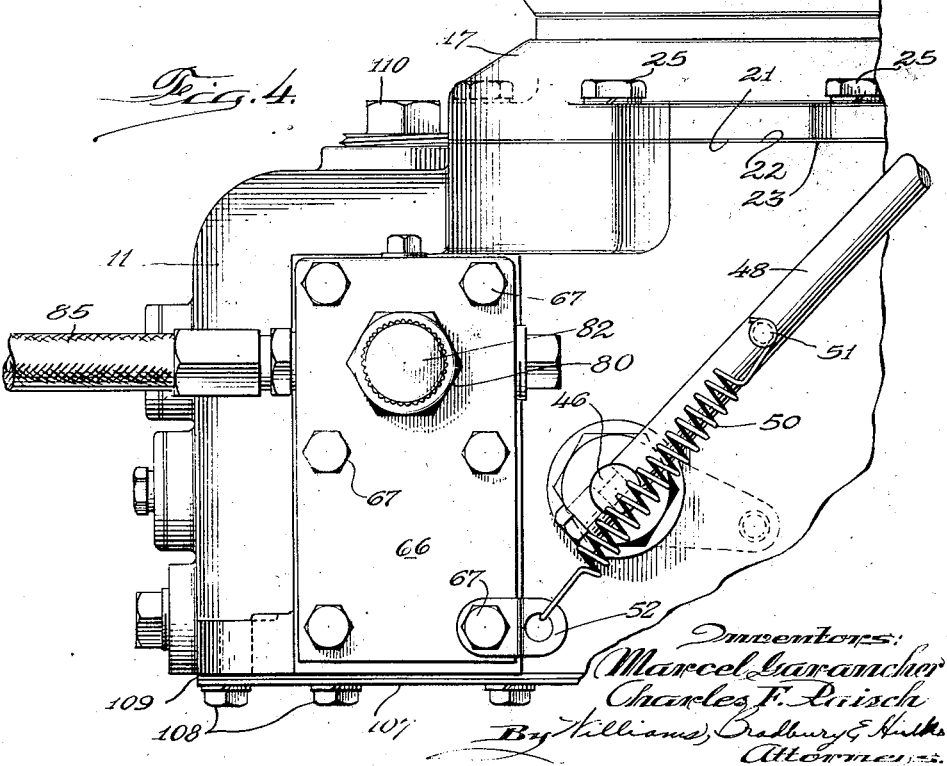
Fig. 4 is a fragmentary elevation looking in the same direction as for Fig. 1.

Referring particularly to Figs. 1 and 4, a lubricant supply hopper 10 is mounted above the compressor body 11 for delivery of grease through the opening 12 of Fig. 1, the registering opening 13 in the housing 11 shown in Fig. 2, which communicates by way of an opening cored into the housing 11, and terminating at 14 in the inner wall of the sleeve 15. The base of the hopper 10 is formed of a casting 17 having an upwardly extending cylindrical sleeve 18 and a downwardly extending bearing portion 19 and a horizontal surface 21 machined for attachment to a matching surface 22 on the compressor body 11. A gasket 23 is compressed between the surfaces 21 and 22 by means of cap screws 25 which pass through the casting 17 and into the compressor body portion 11. The grease passageways 12 and 13 register in the two castings through a corresponding perforation in the gasket 23.

A lubricant feeding screw 27 formed about a shaft 28 journaled in the bearing portion 19 is mounted for rotation within the cylindrical sleeve 18. The end of the shaft 28, extending below the bearing 19 is reduced in diameter at 30, forming a spindle for a worm gear 31 by means of which the shaft 28 may be rotated when the worm gear 31 is locked to its spindle 30.

The underface of the worm gear 31 is provided with a depending integral cross-bar 32 (Figure 6) for engagement by a cross-slot 33 in the upper face of the movable clutch collar 35 arranged for vertical reciprocation along the hexagon sleeve 36, which is pinned to the spindle 30 by a cross-pin 38. The inner surface of the clutch collar 35 is provided with six grooves which fit over the apexes of the hexagon sleeve 36 to form guides upon which the clutch collar 35 readily reciprocates. When the clutch collar 35 is moved upwardly, the cross-slot 33 moves over the cross-bar 32, thus locking the worm gear 31 to the spindle 30. The lower end of the spindle 30 is reduced in size and journaled in the bearing 40 formed in the base of the compressor housing 11. A pair of pins 41 and 42 (Figure 2) carried by arms 43 and 44 extend into a circumferential groove 45 in the clutch collar 35 for raising and lowering the clutch collar when the shaft 46, which carries the arms 43 and 44 and which is journaled in the compressor housing 11, is oscillated by means of the handle 48. A spring 50 tensioned between a lug 51, carried by the handle 48 and a clip 52 attached to the compressor housing 11, passes the center of the shaft 46 when the handle 48 is moved from one position to the other, thus serving to hold the clutch collar 35 either in its engaged or disengaged position.

Inasmuch as the worm gear 31 is in constant registration with the revolving worm 54, the feed screw 27 will be rotated whenever the handle 48 is moved to its upper position and will remain stationary whenever the handle 48 is moved to its lower position. When very thin greases are used, the grease will feed by gravity, but when heavy greases are used, or when the grease is very cold, the rotation of the feed screw 27 is necessary for the proper feeding of the grease through the channels 12 and 13 to the port 14 in the sleeve 15.

The shaft 55, upon which the worm 54 is formed, is journaled in the pump housing 11 and preferably provided near its protruding end with a suitable packing 56 to prevent grease or oil from working outwardly along the shaft 55. The protruding end of the shaft 55 is connected with a power source, not shown, for rotating the shaft. An eccentric 58 provided with a hardened rim 59 is carried near the inner end of the shaft 55 and is held against rotation on the shaft by any suitable means, such as a Woodruff key 60, and a jamb nut 61, which holds the eccentric 58 against the shoulder 62 on the shaft 55.

A pump cylinder 65 is mounted within the sleeve 15 and is held in place by means of a conduit cap 66 attached to the compressor casting 11 by means of cap screws 67. The fit of the outside of the cylinder 65 within the sleeve 15 is sufficiently snug to prevent movement of the cylinder in the sleeve as the result of lateral forces on the cylinder, but leakage of air into the space between the cylinder 65 and the sleeve 15 is prevented by a gasket 70 held in place by the same spring 71 which acts to move the piston 72 outwardly within the cylindrical bore of the cylinder 65, the strength of the spring 71 being sufficient to move the piston 72 outwardly against a complete vacuum on the end of the piston 72. The external end of the piston 72 is provided with a head 73 serving as an abutment for the spring 71 and for engagement by the rim 59 of the eccentric 58 for reciprocating the piston 72 under normal operating conditions.

The cylinder 65 is provided with a circumferential groove 74 for conducting grease from the passageway 14 through one or more radial openings 75 to the bore of the cylinder. The discharge end of the bore of cylinder 65 is closed by a ball valve 77 held in place by a follower 78, which is pressed against the ball 77 by a spring 79 seated on a screw plug 80. The ends of the spring 79 contract into recesses in the follower 78 and the inner end of the screw plug 80 so that upon the removal of the screw plug 80 from its threaded position in the conduit cap 66, the follower 78 and spring 79 will remain in their assembled condition. The screw plug 80 is provided with a vent 81 and with a hand screw 82, which latter may be retracted for opening a passageway to atmosphere to permit the escape of air for satisfactorily starting the operation of the pump, and likewise to provide a ready means for reducing the grease pressure in the interior of the conduit cap 66 when occasion arises.

A pair of conduits formed at right angles to one another within the conduit cap 66 cross on the axis of the bore of the cylinder 65. One of these conduits 84 (Figure 5) provides outlets for one or more pressure hoses 85 used to conduct grease under pressure through a suitable nozzle, not shown, to fittings on parts to be lubricated to various ones of which the nozzle may be successively attached. The conduit 86, which extends at right angles to the conduit 84, conducts grease under pressure to and from a compartment containing a spring 87, the entrance to this compartment being by way of ball valve 88, and the discharge from this compartment being by way of ball valve 89, the seats for both of said valves being formed in a plug 90 which closes the end of the spring compartment 87, and is held in place by being suitably clamped between the end 91 of the housing for the spring 87 and the shoulder 92 formed in the conduit cap 66, the spring housing 94 being threaded into a tapped aperture in the conduit cap 66. The inner end of the spring housing 94 is closed by a threaded plug 95 containing a cylindrical bore in which a piston 96 is adapted to be reciprocated outwardly by grease pressure within the housing 94. A packing 98, compressed by a gland 99, prevents the escape of grease around the piston 96.

The spring 87, here illustrated as two concentric springs, abuts between the threaded plug 95 and a follower 100 which presses upon the ball valve 88 to hold it seated against a very high grease pressure in the conduit 86. When the pressure in the conduit 86 rises above a predetermined high pressure, such as will be developed whenever the shaft 55 is rotating and the nozzle end of the hose 85 is closed, grease flows past the ball vave 88 and into the spring housing 94 and exerts a pressure upon the inner end of the piston 96. This causes the piston 96 to move outwardly, pressing upon the roller 103 mounted between two swinging arms 104 pivoted upon a cross shaft 105, the remote ends 106 of the swinging arms lying one on each side of the eccentric 58 and being adapted to press upon the piston head 73 to hold the piston 72 in a depressed position a sufficient distance to close the intake ports until the grease pressure in the spring housing 94 has been released.

Figure 3:
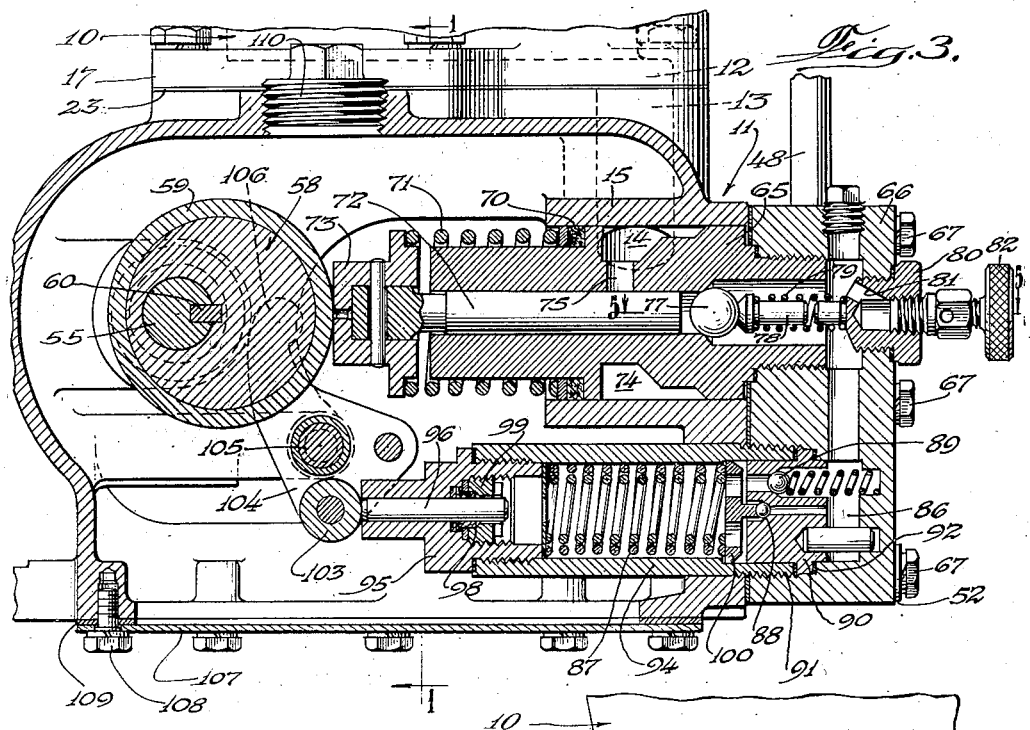
Fig. 3 is a section taken on the line 3—3 of Fig. 1.

Since the piston 96 is of smaller diameter than the piston 72, the amount of grease displaced by the end of the piston 72 in one movement from the grease entrance openings 75 to the bottom of its stroke is more than sufficient to move the smaller piston 96 outwardly, causing the swinging arms 104 to hold the piston head 73 and piston 72 in a depressed position, the surplus grease being accommodated by the enlargement of the hose due to its expansion under the extremely high pressure. During such period as the piston head 73 is held in its fully depressed position, as shown in Fig. 3, the shaft 55 will be rotated without the expenditure of energy for reciprocating the piston 72. Thus the source of power is relieved of supplying power to the compressor while the nozzle is being moved from one fitting to another, the grease pressure, however, within the hose being maintained at its highest value.

Access to the interior of the compressor housing 11 may be had by the removal of the bottom plate 107 which is held in place by a plurality of cap screws 108 which force the plate 107 tightly against a gasket 109. A plug 110 is threaded into the upper surface of the housing 11 to give access to the interior of the housing for oiling the interior moving parts which are not in contact with the grease being pumped.

While we have shown and described a preferred embodiment of our invention, it will be readily understood by those skilled in the art that variations may be made in the construction disclosed without departing from the basic features of our invention. We therefore do not wish to be limited to the precise construction disclosed, but wish to include within the scope of our invention all such modifications and variations which will readily suggest themselves.

Having thus described our invention, what we claim as new and useful and desire to secure by Letters Patent of the United States is:

1. In a lubricant compressor, a power driven shaft, a piston movable in its compression direction by the rotation of said shaft, a spring for moving the piston in the return direction, and lubricant pressure operated means for engaging the piston when in its compression position to prevent the movement of the piston in its return direction whenever the lubricant pressure exceeds a predetermined value, said spring returning said lubricant pressure operated means to non-engaging position when the lubricant pressure falls below the predetermined value.

2. In a lubricant compressor, a power driven shaft, an eccentric on the shaft, a first piston moved in its compression direction by the rotation of the eccentric, a spring for moving said first piston in the return direction, a cylinder in which said first piston reciprocates having lubricant inlet and discharge ports, a conduit connected with the discharge port, a second piston, a spring pressed valve for admitting lubricant from the conduit to the head of the second piston when the pressure in the conduit reaches or exceeds a predetermined value, an arm moved by the second piston for enagement with the first piston to hold the first piston in its compression position upon the movement of the second piston under the influence of high lubricant pressure and means to relieve the lubricant pressure on the second piston when the lubricant pressure in the conduit falls below a predetermined value.

3. In a lubricant compressor, a power driven shaft, a first piston moved in its compression direction by the rotation of said shaft, spring means for moving the first piston in the return direction, a conduit receiving lubricant under pressure upon each stroke of the first piston in its compression direction, a chamber in communication with said conduit, a pair of valves between said chamber and said conduit, one admitting lubricant to the chamber when the pressure in the conduit exceeds a predetermined value and the other admitting lubricant from the chamber to the conduit when the pressure within the chamber is greater than that in the conduit, a second piston acted upon by lubricant pressure in the chamber and means operated by the second piston for holding the first piston in its compression position whenever the lubricant pressure in said chamber exceeds a predetermined value.

4. In a lubricant compressor, a piston, power means for moving the piston in the compression direction, spring means for moving the piston in the return direction, a lubricant conduit for receiving lubricant under pressure responsive to the compression movement of said piston, and means to hold the piston in its compression position at all times when the flow of lubricant from said conduit is interrupted, said means being actuated by lubricant in said conduit under pressure above a predetermined value, said spring restoring said piston holding means to non-holding position when the pressure of the lubricant in said conduit falls below the predetermined value.

5. In a lubricant compressor, a power driven shaft, an eccentric thereon, a piston head spring pressed toward said eccentric normally reciprocated by the rotation of said eccentric, a pair of arms one lying on each side of said eccentric and having ends for exerting pressure on said piston head at each side of the eccentric, and means to force the ends of said arms into contact with the piston head to hold the piston head in its depressed position and prevent its being reciprocated by the eccentric, said spring pressed piston head returning said arms and said last-mentioned means to inactive position when said piston head commences normal reciprocation.

6. In a lubricant compressor having a lubricant reservoir and power means to create a pressure on the lubricant at the bottom of said reservoir, the combination of a cylinder having an opening in its wall in communication with the lubricant under pressure in said reservoir, a power reciprocated piston normally moving past the opening through the wall of the cylinder to permit lubricant to be forced into the cylinder by the differential in pressure between the interior of the cylinder and the lubricant in the opening through the cylinder wall, a spring for moving the piston to its position in which the opening in the cylinder wall is uncovered by the piston, and means responsive to pressure created by the power stroke of said piston for preventing the piston from returning to the position for uncovering the opening through the wall of the cylinder under the influence of said spring.

7. In a lubricant compressor, a piston mounted for reciprocation in said cylinder, a valve closing the discharge from said cylinder opened by the movement of lubricant from said cylinder and preventing the backflow of lubricant to said cylinder the cylinder wall having an opening therein uncovered by said piston at the end of its retractile stroke, a spring for moving the said piston on its retractile stroke, said spring having sufficient strength to create a complete vacuum between said valve and the end of said piston during the retractile stroke of the piston, power means for moving said piston on its compression stroke, means for holding said piston at the end of its compression stroke and a lubricant pressure operated device for applying force to said means sufficient when augmented by the vacuum within the cylinder to overcome the retractile force of said spring.

8. In a lubricant compressor having a lubricant hopper, the combination of a cylinder having an opening in its wall to communicate with said hopper, a piston reciprocable in said cylinder, power driven means for moving the piston in one direction, a spring for moving the piston in the opposite direction, said opening through the cylinder wall being located in a position to be uncovered by said piston at the end of its retractile stroke, a check valve permitting flow of lubricant from said cylinder as the piston is being moved on its power stroke, a conduit in communication with the discharge side of said check valve, said conduit being adapted for connection with devices to receive lubricant under pressure, a movable wall in communication with said conduit and adapted to be moved when the pressure in said conduit exceeds a predetermined maximum, a lever moved by said movable wall into contact with the end of said piston to hold the piston at the end of its power stroke whereby the power driven means may continue to operate without acting upon said piston, the release of pressure of said lubricant on said conduit serving to permit the retraction of said movable wall and permit the resumption of reciprocation of said piston by said power driven means.

MARCEL GARANCHER.
CHARLES F. RAISCH.